(No Model.) 2 Sheets—Sheet 2.

G. TUSSING.
Farm Gate.

No. 233,819. Patented Oct. 26, 1880.

Attest:
Geo. T. Smallwood Jr.
Floyd Norris

Inventor:
George Tussing
By Johnson and Johnson
Attys.

United States Patent Office.

GEORGE TUSSING, OF BASIL, OHIO.

FARM-GATE.

SPECIFICATION forming part of Letters Patent No. 233,819, dated October 26, 1880.

Application filed September 8, 1880. (No model.)

*To all whom it may concern:*

Be it known that I, GEORGE TUSSING, a citizen of the United States, residing at Basil, in the county of Fairfield and State of Ohio, have invented new and useful Improvements in Farm-Gates, of which the following is a specification.

My improvement relates to gates which are adapted to be opened and closed by a sliding movement upon rolls, and upon which it is also supported. In connection with such gate I provide its inner end with a semicircular or segmental bearing, and arrange a vibrating arm to operate back of and upon said end bearing to close the gate, said arm having a free connection therewith, by which the gate is opened. Levers are arranged to operate the gate by a person upon horse or in carriage, and the construction is simple and effective for the purpose.

Figure 1:
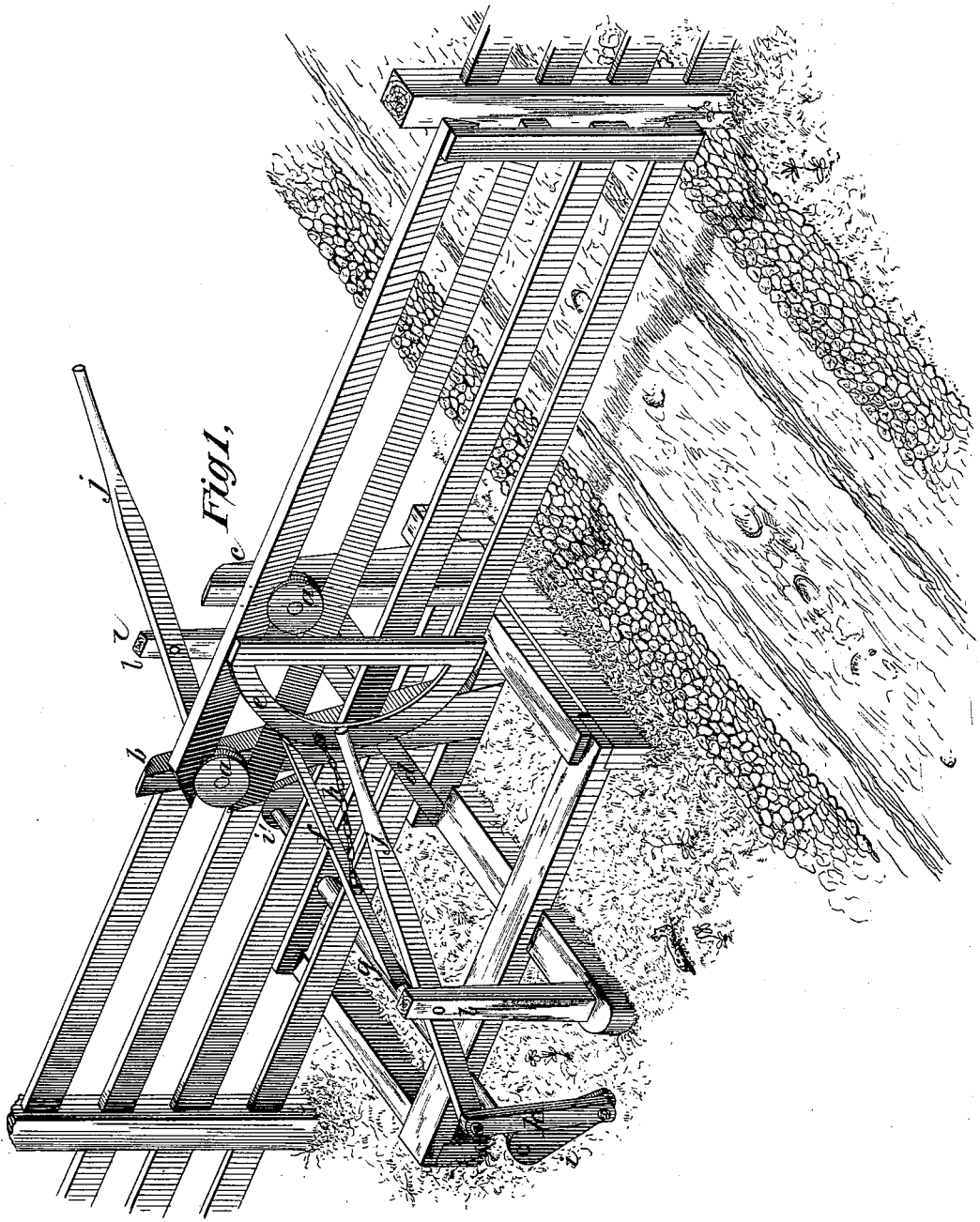
Figure 2:
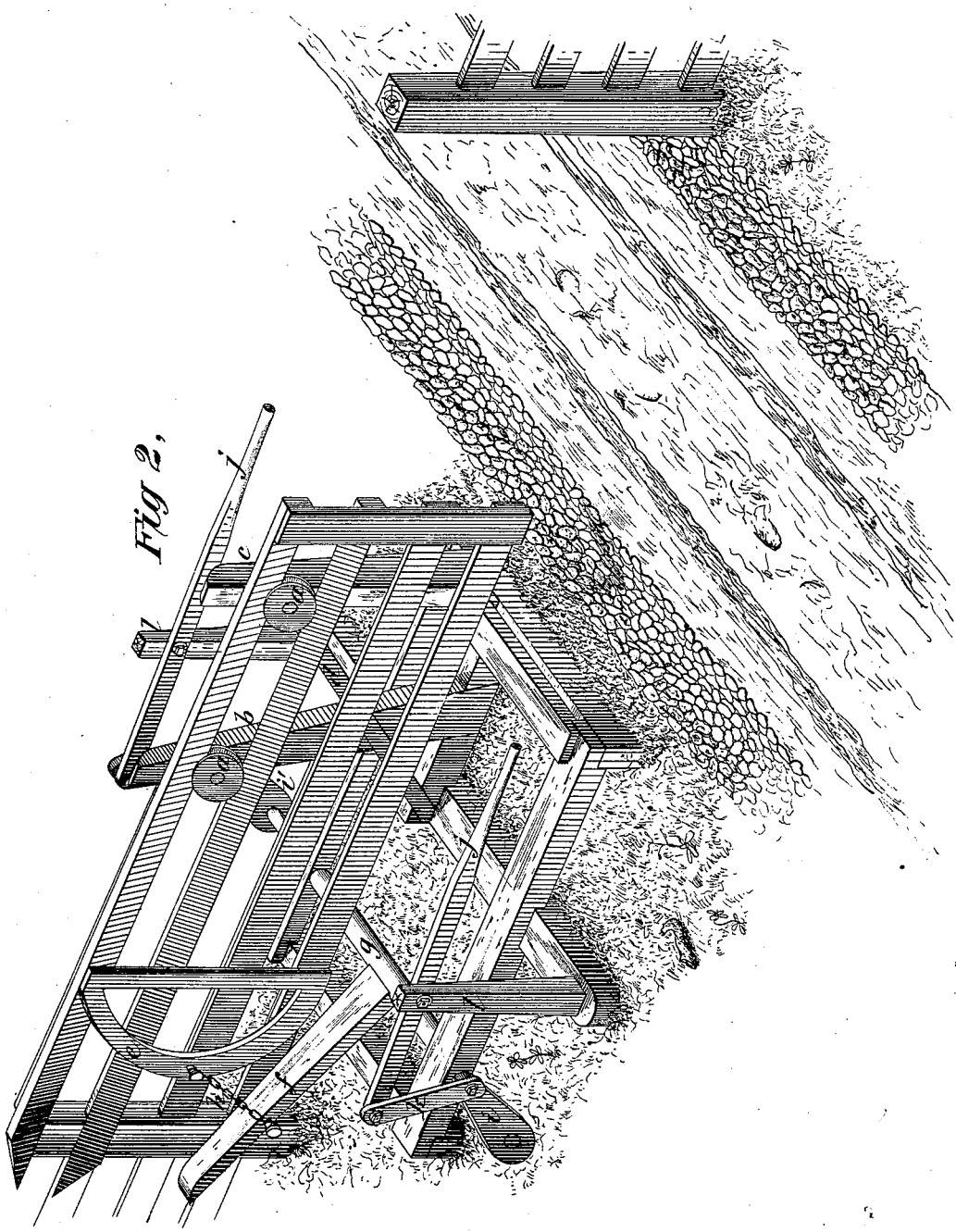

Referring to the accompanying drawings, Figure 1 represents a view, in perspective, of the gate as closed, and Fig. 2 shows the gate open.

The gate is mounted upon rolls $a\,a$, which are supported by a frame consisting of an oblique and a vertical post, $b\,c$, united by a brace, $d$, and a sill-piece, which may be secured in the ground in any suitable way.

The gate is supported by its upper bar, and the rolls are grooved to receive the edges of the two upper bars, to secure the gate and allow it to travel upon said rolls in being opened and closed by sliding along the side of the supporting-frame.

One of the rolls is secured in the oblique post and the other in the vertical post, and the distance between them is sufficient to hold the gate in a horizontal position, whether open or closed, and to give it a straight movement.

The inner end of the gate terminates in, or is provided with, a segmental piece, $e$, in vertical position to form a convex bearing to receive the pushing action of an arm, $f$, to close the gate. This arm rises from a rock-shaft, $g$, suitably supported in a sill-frame, and its range of movement is in vertical plane with the convex bearing-piece of the gate, to which it is attached by a short piece of rope, strap, or chain, $h$, by which the arm pulls the gate open.

An open-link connection would answer the purpose of a free connection, the object being to allow the arm to slide over and upon the convex bearing-piece in pushing the gate out from and in line with the fence.

The back throw of the arm pulls the gate open by the free connection, and the forward throw of the arm strikes the convex bearing and pushes with a cam or crank action to slide out the gate.

The rock-shaft $g$ has a crank, $i\,i$, at each end, which are set in the same direction, or nearly, so as to operate the pulling and pushing arm, and the hand-levers $j\,j$ are connected to said cranks by a link, $k$, by which the gate is operated.

The hand-levers are supported by posts $l$, and they are arranged on each side of the fence by the side of the road, so that persons riding or on foot can easily open and close the gate.

The arm $f$ may be operated by connections arranged to receive the action of the wheels of a wagon or carriage, and the gate would in such case be opened and closed by the passing of the team. The end of the arm is beveled for proper action upon the convex bearing. The upper bars of the gate are longer than the others and extend back of said convex bearing.

I do not claim, broadly, the opening and closing of a gate by a vibrating arm operating with a pulling and a pushing force upon the gate, either in vertical slots therein or by free connections therewith.

I claim—

A sliding gate provided with the segmental bearing $e$, in combination with the vibrating arm $f$ and chain $h$, the latter connecting said vibrating arm with the segmental bearing, substantially as set forth.

In testimony whereof I have hereunto set my hand in the presence of two subscribing witnesses.

GEORGE TUSSING.

Witnesses:
J. K. BUCHANAN,
JOHN W. CHAPMAN.